United States Patent
Sharifi Mehr

(10) Patent No.: US 10,205,803 B1
(45) Date of Patent: Feb. 12, 2019

(54) SYSTEM FOR DETERMINING IMPROPER PORT CONFIGURATIONS

(71) Applicant: AMAZON TECHNOLOGIES, INC., Seattle, WA (US)

(72) Inventor: Nima Sharifi Mehr, Vancouver (CA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 99 days.

(21) Appl. No.: 14/838,108

(22) Filed: Aug. 27, 2015

(51) Int. Cl.
H04L 29/06 (2006.01)
H04L 29/08 (2006.01)

(52) U.S. Cl.
CPC .......... H04L 69/08 (2013.01); H04L 63/10 (2013.01); H04L 63/166 (2013.01); H04L 67/02 (2013.01); H04L 67/42 (2013.01)

(58) Field of Classification Search
CPC ....................................... H04L 69/08
USPC ............................................ 726/3
See application file for complete search history.

(56) References Cited

U.S. PATENT DOCUMENTS

| | | | |
|---|---|---|---|
| 6,182,146 B1 * | 1/2001 | Graham-Cumming, Jr. ........ H04L 29/12009 370/389 |
| 7,127,524 B1 * | 10/2006 | Renda .............. H04L 29/12 709/245 |
| 7,386,010 B2 * | 6/2008 | Solomon ........... H04L 69/08 370/389 |
| 7,434,262 B2 * | 10/2008 | Aaron ............. H04L 63/0263 709/206 |
| 7,681,229 B1 * | 3/2010 | Ebrahimi .......... H04L 63/0281 709/229 |
| 7,797,738 B1 * | 9/2010 | Spatscheck ....... H04L 63/1458 726/13 |
| 8,245,285 B1 * | 8/2012 | Ravishankar ......... G06F 21/77 726/9 |
| 8,428,061 B1 * | 4/2013 | Kopelman ......... H04L 12/462 370/392 |
| 8,966,584 B2 * | 2/2015 | Hughes ............ H04L 63/08 709/225 |
| 9,189,634 B2 * | 11/2015 | Lin ................ G06F 21/577 |
| 9,749,305 B1 * | 8/2017 | Sharifi Mehr ....... G06F 21/44 |
| 2002/0103857 A1 * | 8/2002 | Soderberg ......... H04L 63/0428 709/203 |
| 2005/0114469 A1 * | 5/2005 | Nakamura ........... G06F 9/44 709/218 |
| 2007/0033454 A1 * | 2/2007 | Moss ............... G06F 21/74 714/724 |
| 2007/0061434 A1 * | 3/2007 | Schmieder ......... H04L 67/14 709/223 |

(Continued)

*Primary Examiner* — Harris C Wang
(74) *Attorney, Agent, or Firm* — Lindauer Law, PLLC

(57) ABSTRACT

Described are techniques for determining causes of failed connections, such as a mismatch between a protocol associated with a request and the protocol associated with a port to which the request is provided. The port may be configured to process requests having a particular protocol, while monitoring and recognizing protocols used by other ports. If the request is determined to be associated with a different protocol supported by another port, a notification of the error may be provided to the client associated with the request. Based on characteristics of the request, the client, and the port, a control action may be taken, which may include rejecting the request or processing the request at the received port using a different protocol. Commonalities between failed requests may be analyzed to determine sources of error.

20 Claims, 7 Drawing Sheets

(56) References Cited

U.S. PATENT DOCUMENTS

| | | | |
|---|---|---|---|
| 2008/0189788 A1* | 8/2008 | Bahl ..................... | G06F 21/577 |
| | | | 726/25 |
| 2008/0263215 A1* | 10/2008 | Schnellbaecher ... | H04L 63/0281 |
| | | | 709/229 |
| 2011/0004752 A1* | 1/2011 | Shukla ................... | H04L 69/16 |
| | | | 713/152 |
| 2012/0072531 A1* | 3/2012 | Akuzawa ............. | G06F 9/4401 |
| | | | 709/217 |

\* cited by examiner

SYSTEM FOR DETERMINING IMPROPER PORT CONFIGURATIONS

BACKGROUND

Web servers and other types of communication devices may receive communications on various ports. Different ports may support different protocols.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
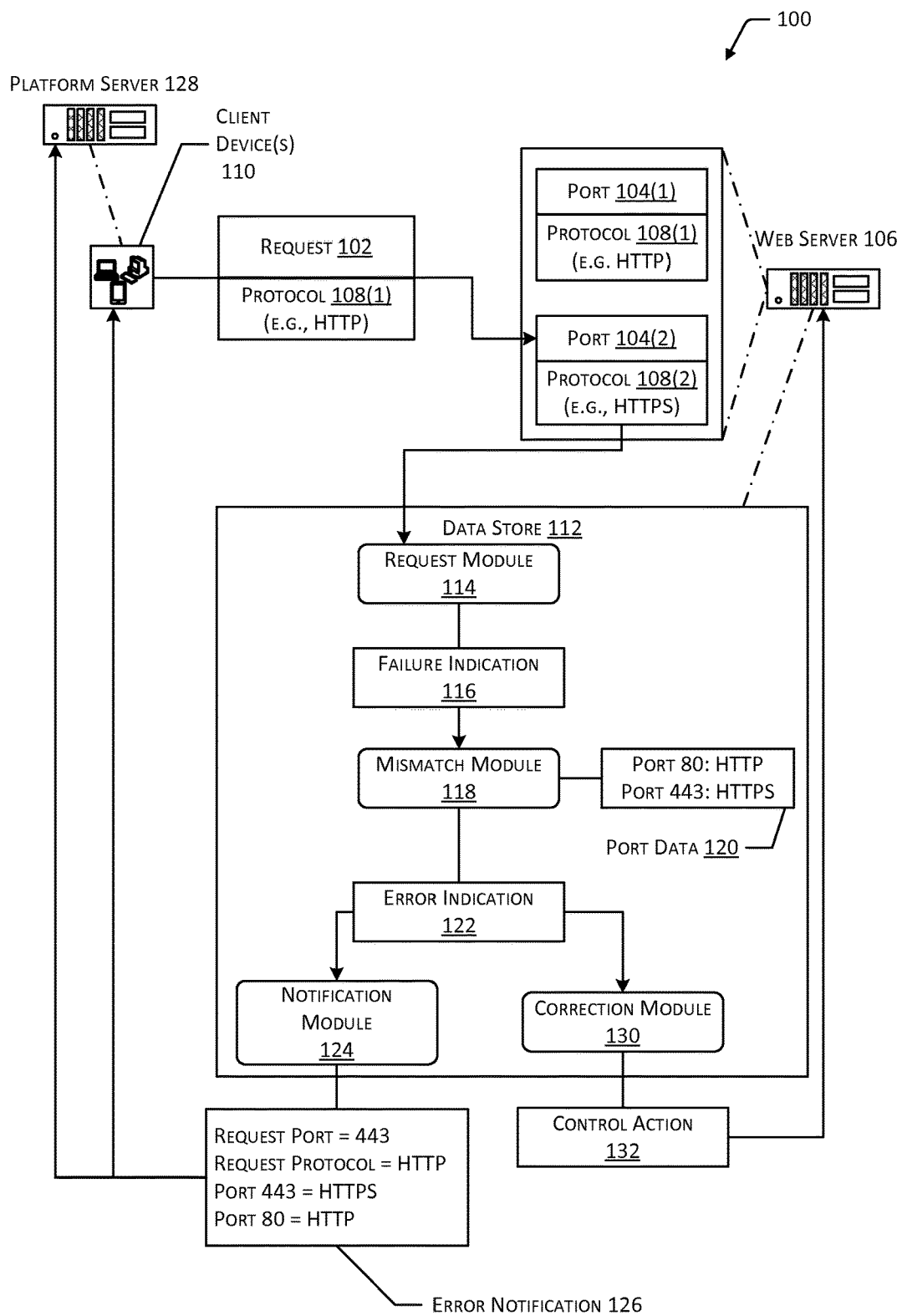
FIG. 1 depicts a system for determining a request provided to an incorrect port of a web server, or provided using an incorrect protocol.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

To access a web server or other type of computing device, a device or service may be configured to provide a request to the web server. A web server may be configured to communicate with a variety of devices or services on multiple ports, each port assigned an arbitrary number (e.g., ranging from zero to 65,535). Each port may be configured to process requests having a particular communication protocol. For example, port number 80 may be configured to process requests sent using Hypertext Transfer Protocol (HTTP), while port number 443 may be configured to process requests sent using Hypertext Transfer Protocol Secure (HTTPS). For example, a port number may be used in conjunction with a network address, such as an Internet Protocol (IP) address, to differentiate between use of different protocols. For example, a web server may include a numbered port for each service available on the server, such as File Transfer Protocol (FTP) on port 21, telnet on port 23, Simple Mail Transfer Protocol (SMTP) on port 25, nameserver on port 53, HTTP on port 80, HTTPS on port 443, and so forth. Different protocols may include different network protocols, different authentication mechanisms, or both different network protocols and different authentication mechanisms. For example, while HTTP and HTTPS may include the same or similar network protocols, HTTP and HTTPS include different authentication mechanisms. Source and destination ports may be specified in communications, such as within the header of a transport layer protocol. A client configuring a service to access a webserver must typically know the number of a port to access and the appropriate protocol to use when providing a communication to that port. In some cases, a protocol may be independent of a port. For example, a host device may be configured to process requests associated with a particular protocol independent of a port or other aspects of transmission control protocol (TCP).

When a web server supports multiple protocols on different ports, this functionality increases the likelihood that a service may be misconfigured to access an improper port or use an improper protocol. For example, a service may provide a request using HTTP to a port configured to process requests using HTTPS. Under normal circumstances, a request provided to a port using the incorrect protocol will be rejected as it fails a Secure Sockets Layer (SSL) or Transport Layer Security (TLS) handshake. Because this failure of the request occurs early in the communication process, before substantive communication with the web server occurs, clients may not be provided with detail regarding the failed request that is sufficient to determine the error. For example, a network service may notify a client regarding a failed request, but may not necessarily notify a client regarding a potential client-side Transmission Control Protocol (TCP) or User Datagram Protocol (UDP) port misconfiguration.

Described in this disclosure are techniques for determining failed requests, or requests that are otherwise processed in a deficient or suboptimal manner, that occur due to port or protocol mismatches and generating a notification containing data sufficient to enable clients to promptly correct the error. In some implementations, requests that include an improper port or protocol may still be processed rather than rejecting the request. In other implementations, such requests may fail until the error has been corrected.

Each port of a web server may be configured to process requests using a particular protocol. In some implementations, each port may also be configured to process requests having certain characteristics (e.g., size, type, etc.). For example, two ports may both be configured to use the same protocol, however, a first port may be configured to process requests exceeding a particular size, while the second port is configured to process requests less than the particular size. Each port (e.g., a process or computing device associated therewith) may be configured to identify requests that use other protocols processed by other ports. When a port, configured to process requests using a first protocol, receives a request associated with a second protocol, the request may be analyzed to determine whether the one or more other ports of the web server are configured to process requests using the second protocol. The request may also be analyzed to determine whether the content of the request could be successfully processed using the second protocol. This determination may indicate that the request is proper or legitimate, but was configured to access the incorrect port or utilize the incorrect protocol. A notification indicating the error, the protocol supported by the accessed port, and one or more other ports that may process requests using the second protocol may be generated and provided to a device associated with the request.

For example, a request may be provided to a first port using HTTP; however, the first port may be configured to process requests using HTTPS. The HTTP request would fail the handshake process at the first port due to lack of a "ClientHello" or other expected content associated with HTTPS. The request could be analyzed, however, to determine that the request is associated with HTTP, and that the content of the request (e.g., plain text, headers, fields, etc.) may be successfully processed at a different port. A notification indicating that the first port is configured to process requests using HTTPS and identifying one or more second ports configured to process HTTP may be generated and provided to a device associated with the request.

In some implementations, the failed request may be rejected. A client associated with the failed request may correct the error relating to the incorrect port or protocol. If the service initiating the request is accessible to the web server, the service may be modified. Modification of the service may include changing the code of the service, changing the deployment status of the service, deactivating the service, reconfiguring the service, and so forth. In other implementations, one or more other control actions may be taken with regard to the request. For example, the request may be provided to a different port configured to process the request using the protocol associated with the request. As another example, the port at which the request is received may be used to process the request using the protocol associated with the request. If the service initiating the request is accessible to the web server, the service may be modified to access the proper port.

In some implementations, the control action undertaken with regard to a request may be based on security data associated with the request. For example, the content of a request may indicate that the request includes private or sensitive information. If the request was provided using an unsecured protocol, such as HTTP, the request may be rejected rather than processed. However, if it is determined that the request does not include private or sensitive information, the request originates from a trusted or secured source or location, the content of the request has been secured using other means, and so forth, the request may be processed independent of the associated protocol. In some implementations, requests may be processed using an improper protocol temporarily, such as for a length of time (e.g., 30 minutes) based on the determined security data. After the length of time has lapsed, subsequent requests received at a port using an improper protocol may be permitted to fail. In other implementations, a particular count of requests may be processed using an improper protocol, such as twenty requests, based on the determined security data. After the particular count of requests has been processed, subsequent requests received at a port using an improper protocol may be permitted to fail. The length of time or the count of requests may be specific to a particular entity or device. For example, a request provided by a first service may be permitted to access an improper port for a first length of time. If a failed request from a second service is received at the improper port during that length of time, requests from the second service may be permitted for a second length of time.

In some implementations, commonalities between failed requests may be used to determine systemic errors. Commonalities may include one or more identical or similar hardware or software elements associated with devices that provided the failed requests. Commonalities may also include identical or similar characteristics of devices that provided the failed requests, such as locations or IP addresses of the devices. For example, a particular service, access credential, or other type of data or software may be deployed to multiple devices. A first request received at a port using an improper protocol may be identified, as described previously. Subsequently, one or more additional requests may be received at the same port, using the same improper protocol. This determination may indicate that the deployment of particular data or software has affected multiple devices, resulting in multiple erroneous requests. In some implementations, the notification that was provided to a device associated with the first request may also be provided to other devices that provide erroneous requests. Additionally, a notification may be provided to a user or device associated with the web server identifying a possible error with the deployed data or software.

For example, when a connection associated with an erroneous access credential fails during the handshake process, insufficient data is normally generated for determining the source of the error. This error may be significant if the erroneous access credential is provided to a large number of devices. In some implementations, client data associated with failed requests or handshakes may be determined to facilitate determination of the error. The client data may include device characteristics, such as an IP address, a Media Access Control (MAC) address, a location, or an identifier of one or more components of the device associated with the request. The client device may also include data indicative of data associated with the device (e.g., access credentials) or software executing on the device (e.g., particular browsers or operating systems). Commonalities between the client data determined from multiple failed requests may be used to identify potential errors. For example, it may be determined that numerous failed requests provided by devices executing a particular browser and operating system failed during the handshake process. If a new certificate was recently deployed to devices executing this browser and operating system, this determination may indicate that the error is associated with the certificate. A notification indicative of the possible error may be provided to a user or device associated with the web server. In some implementations, the web server may automatically undertake a control action to attempt to correct the error, such as by commencing use of a previous version of the certificate. In other implementations, a control action may be undertaken responsive to a failed request based on the control action undertaken for previous requests associated with identical or similar client data. For example, one or more previous requests associated with a particular browser, operating system, or access credential may fail, and a particular control action may be taken responsive to that failure. If a subsequent failed request is determined, that request being associated with client data indicating the same browser, operating system, or access credential, the same control action may be taken with regard to the subsequent failed request. As another example, control actions may include modification of software associated with the web server or one or more ports.

Implementations described herein may thereby enable identification, notification, and correction of errors associated with improper ports, protocols, access credentials, and so forth that may cause requests or other types of communications to fail.

FIG. 1 depicts a system 100 for determining a request 102 provided to an incorrect port 104 of a web server 106, or provided using an incorrect protocol 108. The web server 106 may include any number and any type of computing devices, such as mobile devices, set-top boxes, tablet computers, personal computers, wearable computers, servers, and so forth. The web server 106 may store various data, services, and so forth, which may be accessed by one or more client devices 110 by providing requests 102 to the web server 106. Client devices 110 may include any type of computing device including, but not limited to, those described with regard to the web server 106. For example, a client device 110 may provide a request 102 to the web server 106 using a first protocol 108(1), such as HTTP. Continuing the example, the request 102 may include plain text, such as a GET command, other fields and headers, and so forth. The web server 106 may be configured to process requests 102 using the first protocol 108(1) at a first port 104(1). The web server 106 may also be configured to process requests 102 using a second protocol 108(2), such as HTTPS, at a second port 104(2). As depicted in FIG. 1, in some cases, a request 102 associated with the first protocol 108(1) may be provided to the second port 104(2), which is configured to process requests 102 using the second protocol 108(2). For example, a service executing on the client device 110 may be misconfigured to use the incorrect protocol 108 or to provide requests 102 to the incorrect port 104.

A data store 112 associated with the web server 106 may store a request module 114 for processing the request 102. In some implementations, the data store 112 may use a flat file, database, linked list, tree, executable code, script, or other data structure to store information. The data store 112 may include any number and any type of storage media. In some implementations, the data store 112 may include one or more computer-readable storage media in communication with the web server 106 and accessible thereto. In other implementations, the data store 112 may be associated with one or more computing devices, separate from the web server 106, that may be used to determine errors associated with requests 102 received by the web server 106. In still other implementations, the data store 112 may include a combination of storage media associated with the web server 106 or one or more other computing devices. For example, some of the functions performed by modules within the data store 112 may be performed by the web server 106, while other functions may be performed by other computing devices.

The request module 114 may receive the request 102 at the second port 104(2) and attempt to process the request 102 using the second protocol 108(2). For example, the request module 114 may attempt to perform a handshake process based on the second protocol 108(2) by analyzing at least a portion of the request to determine expected content. Continuing the example, a port 104(2) configured to process requests using HTTPS may analyze the request 102 to determine the presence of a "ClientHello" or other expected content associated with HTTPS. In some implementations, a response from the port 104(2) may be determined. Security data associated with the request may be determined, based at least partly on the response. As depicted in FIG. 1, the request 102 is associated with the first protocol 108(1), while the second port 104(2) is associated with the second protocol 108(2). Responsive to this determination, the request module 114 may generate a failure indication 116, indicative of a failure to process the request 102 at the second port 104(2) using the second protocol 108(2).

A mismatch module 118 associated with the data store 112 may be used to determine whether the protocol 108(1) associated with the request 102 may correspond to a different port 104 of the web server 106. For example, the mismatch module 118 may determine correspondence between at least a portion of the request 102 and port data 120 is indicative of one or more protocols 108 associated with one or more ports 104 of the web server 106. In some implementations, the mismatch module 118 may attempt to process at least a portion of the request 102 using one or more other protocols 108 to determine the protocol 108 that corresponds to the content of the request 102. For example, if a HTTP request that includes plain text and recognized HTTP commands is received at a port 104 that uses HTTPS, the request module 114 may generate a failure indication 116. The mismatch module 118 may attempt to process the request 102 using HTTP based on the port data 120, which may indicate that one or more ports 104 associated with the web server 106 use HTTP. Through this process, the mismatch module 118 may determine that the request 102 includes HTTP content. This mismatch module 118 may generate an error indication 122 indicative of the protocol 108(1) associated with the request 102.

Responsive to the error indication 122, a notification module 124 associated with the data store 112 may generate an error notification 126 to be provided to the client device 110 associated with the request 102. In other implementations, the error notification 126 may be provided to a platform server 128 associated with one or more client devices 110. For example, the platform server 128 may store, modify, or cause execution or deployment of one or more services associated with the client devices 110. In still other implementations, the error notification 126 may be provided to both the platform server 128 and one or more client devices 110. The error notification 126 may include information indicating that the request 102 was provided to the incorrect port 104 or provided using the incorrect protocol 108. For example, the error notification 126 may indicate one or more of the ports 104(1) associated with the request 102 or the protocol 108(2) associated with the request 102. The error notification 126 may also indicate the protocol 108(1) associated with the port 104(1) that received the request 102. The error notification 126 may further indicate one or more other ports 104, such as the second port 104(2) that may use the protocol 108(2) associated with the request 102. Responsive to the error notification 126, a client associated with the client device 110 or the platform server 128 may modify subsequent requests 102 provided to the web server 106. In some implementations, a computing device may be configured to automatically modify subsequent requests 102 responsive to the error notification 126. For example, the platform server 128 or the client device 110 providing the request 102 may be associated with the same entity as the web server 106. One or more modules associated with the platform server 128, the client device 110, or the web server 106 may be configured to modify a service that generated the request 102 responsive to the error notification 126.

In some implementations, a correction module 130 associated with the data store 112 may perform one or more control actions 132 with regard to the request 102 responsive to the error indication 122. Control actions 132 may include rejecting the request 102 or otherwise permitting the request 102 to fail. In other implementations, a control action 132 may include modifying a service, as described previously. In still other implementations, a control action 132 may include providing the request 102 to the first port 104(1) to be processed using the first protocol 108(1). In other implementations, a control action 132 may include processing the request 102 at the second port 104(2) using the first protocol 108(1). Any combination of control actions 132 may be performed. For example, a request 102 may be processed at the second port 104(2) using the first protocol 108(1), and the service associated with the request 102 may be modified.

Figure 2:
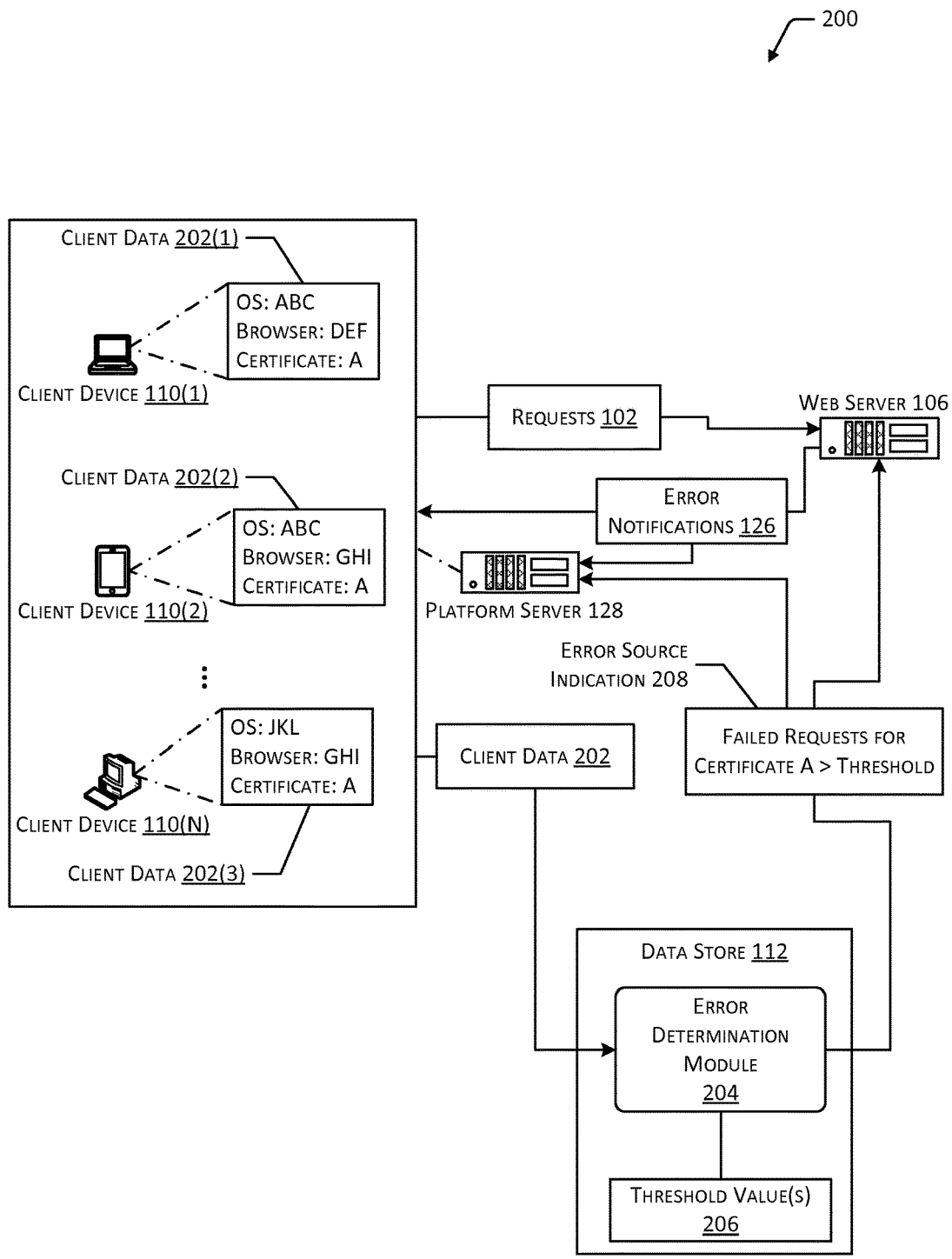
FIG. 2 depicts a system for determining potential sources of erroneous requests based on client data associated with client devices.

FIG. 2 depicts a system 200 for determining potential sources of erroneous requests 102 based on client data 202 associated with client devices 110. As described previously with regard to FIG. 1, client devices 110 may provide requests 102 to a web server 106. In the event that one or more of the requests 102 fail, such as if a request 102 is provided to a port 104 of the web server 106 that is not configured to process the protocol 108 associated with the request(s) 102, one or more error notifications 126 may be generated and provided to one or more client devices 110 or the platform server 128 associated with the client device(s) 110. If the failure of one or more requests 102 is caused by a particular device characteristic or software deployed on or common to multiple client devices 110, it may be possible to prevent subsequent erroneous requests 102 by correcting for the device characteristic or software. For example, if a service or access credential used by multiple client devices 110 is deployed, and an error exists in the configuration of the service or access credential, ceasing use of the newly deployed software and returning to a previous version may prevent subsequent erroneous requests 102.

In some implementations, when multiple error indications 122 are determined, possible causes of improper requests 102 may be determined based on client data 202 associated with the client devices 110. For example, FIG. 2 depicts a first client device 110(1) having first client data 202(1) associated therewith and a second client device 110(2) having second client data 202(2) associated therewith. Any number of additional client devices 110(N) may include additional client data 202(N) associated therewith. The client data 202 may indicate data or software executing on or stored in association with a corresponding client device 110, such as an operating system, a browser, access credentials (e.g., a certificate), and so forth. In other implementations, the client data 202 may indicate hardware components of corresponding client devices 110. In still other implementations, client data 202 may indicate characteristics of client devices 110 such as a location, IP address, MAC address, and so forth.

Responsive to one or more error indications 112 an error determination module 204 associated with the data store 112 may determine client data 202 from client devices 110 associated with failed requests 102. The error determination module 204 may analyze the client data 202 to determine common characteristics of client devices 110 associated with failed requests 102. For example, FIG. 2 depicts the client data 202 for each of the client devices 110 indicating the same certificate (e.g., "Certificate: A"). This determination may indicate that an error associated with the certificate may cause requests 102 associated with the particular client devices 110 to fail. In some implementations, the error determination module 204 may determine correspondence between the client data 202 and one or more threshold values 206. For example, if a number of failed requests associated with "Certificate: A" exceeds a corresponding threshold value 206, this determination may indicate an error associated with the certificate. The error determination module 204 may generate an error source indication 208 indicative of one or more possible sources of error causing the failed requests 102. In some implementations, the error source indication 208 may be provided to one or more of a user or device associated with the web server 106, the platform server 128, or one or more client devices 110 to enable the error to be corrected.

In some implementations, the correction module 130 or another module may undertake a control action 132 to compensate for the error. For example, if a newly-deployed certificate is determined to be erroneous, the correction module 130 may cause the web server 106 to cease using the erroneous certificate and begin use of a previous version of the certificate. As another example, a particular certificate may cause requests 102 to fail when used in conjunction with a particular browser or a particular operating system. The error determination module 204 may determine this error by determining commonalities between the client data 202 for client devices 110 associated with the failed requests 102.

Figure 3:
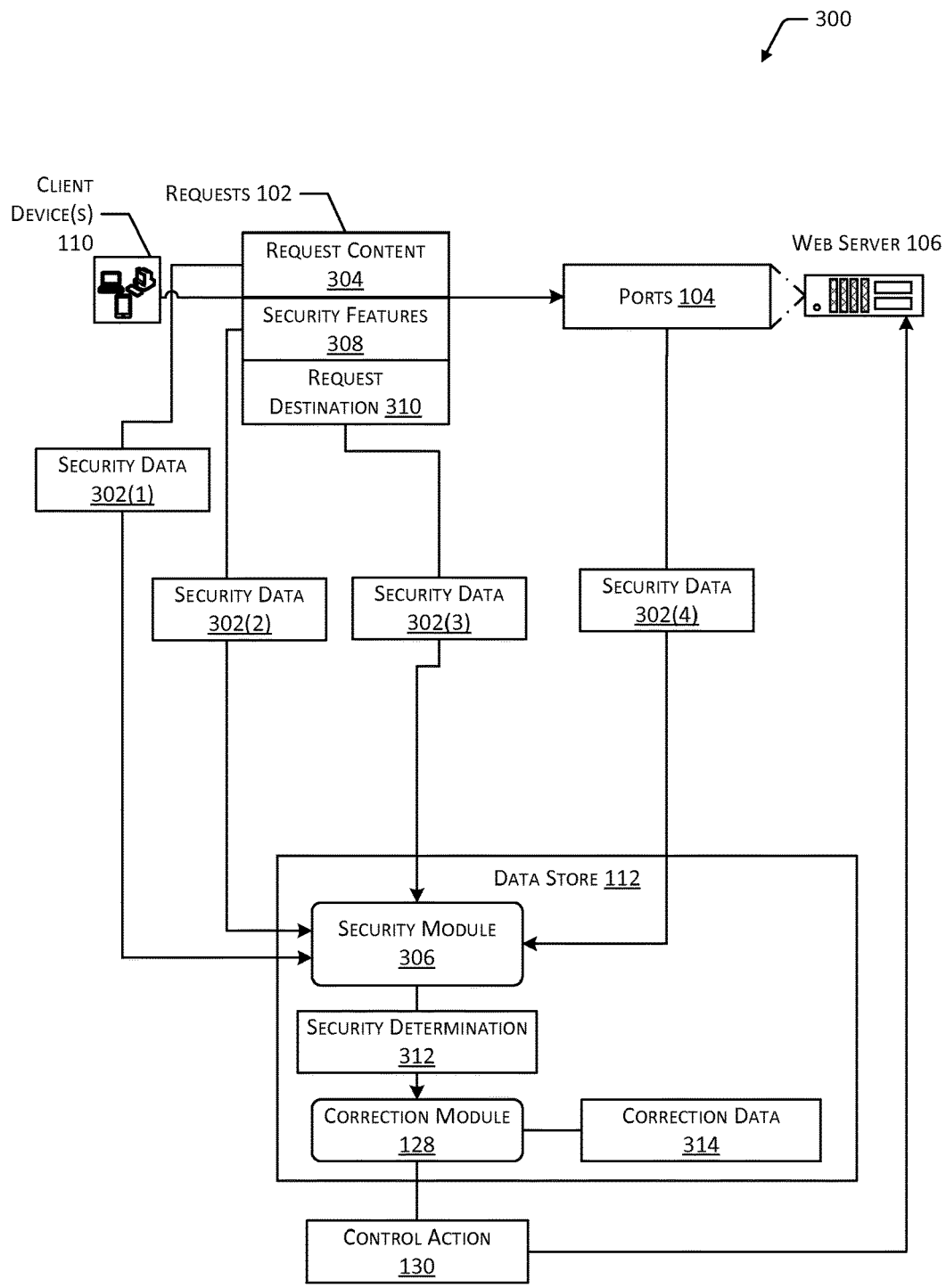
FIG. 3 depicts a system for determining one or more control actions to be taken with regard to a request based on security data associated with the request.

FIG. 3 depicts a system 300 for determining one or more control actions 132 to be taken with regard to a request 102 based on security data 302 associated with the request 102. As described previously with regard to FIG. 1, client devices 110 may provide requests 102 to one or more ports 104 of a web server 106. One or more requests 102 may be provided to an incorrect port 104 or provided using an incorrect protocol 108 that does not match the protocol 108 associated with a port 104. This may result in the generation of an error notification 126, which may be provided to the client device(s) 110 associated with one or more failed requests 102. In some implementations, responsive to a failed request 102, the correction module 130 may cause a control action 132 to be taken. Control actions 132 may include rejecting a request 102 or otherwise permitting the request 102 to fail, modifying a service, providing the request 102 to a different port 104, or processing the request 102 at the port 104 at which it was received using a different protocol 108. The particular control action 132 taken with regard to a request 102 may be determined at least partly based on security data 302 associated with the request 102.

A request 102 may include request content 304. The request content 304 may include any manner of alphanumeric data, audio data, image data, metadata, and so forth. For example, the request content 304 may identify the source of the request 102, one or more resources to be accessed, or other types of data associated with the purpose of the request 102. Metadata associated with the request 102 may indicate a type or category associated with the request content 304 or one or more characteristics of the request content 304, such as whether the request content 304 includes sensitive or private data. A security module 306 associated with the data store 112 may determine security data 302(1) based on the request content 304. For example, the security module 306 may be configured to determine particular alphanumeric strings, image data, or audio data that corresponds to private or sensitive information. As another example, the security module 306 may be configured to determine metadata indicative of private or sensitive information. The nature of the request content 304 may affect the control action 132 undertaken with regard to the request 102. For example, due to security risks, the web server 106 may reject a request 102 containing sensitive information rather than processing the request 102 using an unsecured protocol 108.

The request 102 may also include one or more security features 308. The security features 308 may include one or more types of encryption, access credentials, limitations regarding the devices that may access the request 102 (e.g., whitelists or blacklists), or other methods for limiting access to the request content 304 or obfuscating the request content 304. In some implementations, the security features 308 may include characteristics of the protocol 108 associated with the request 102. For example, the security features 308 may include the TLS or SSL authentication process used by HTTPS. The security module 306 may determine security data 302(2) based on the security features 308 of the request 102. The security features 308 may affect the control action 132 undertaken with regard to the request 102. For example, due to security risks, the web server 106 may reject a request 102 that includes unencrypted information rather than processing the request 102 using an unsecured protocol 108.

The request 102 may further include a request destination 310 indicative of the location, device, resource, data container, or other address or identifier associated with the destination or target of the request 102. Data associated with the destination of the request 102 may indicate whether the request destination 310 is associated with a private, confidential, or high-security destination. Data associated with the destination may also indicate whether the destination includes one or more security controls. The security module 306 may determine security data 302(3) based on the request destination 310. The security features 308 may affect the control action 132 undertaken with regard to the request 102. For example, due to security risks, the web server 106 may reject a request 102 that includes a private or sensitive request destination 310 that lacks security controls.

The security module 306 may also determine security data 302(4) associated with one or more ports 104 of the web server 106. For example, accessing one or more of the ports 104 may require particular access credentials, passwords, use of particular encryption schema, and so forth. The security data 302(4) may be indicative of security features associated with the port(s) 104. In some implementations, the security data 302(4) may also be indicative of security features associated with protocols 108 used by the port(s) 104. The security data 302(4) associated with the ports 104 may affect the control action 132 undertaken with regard to the request 102. For example, due to security risks, the web server 106 may reject a request 102 that is provided to a port 104 lacking security features rather than processing the request 102 using an unsecured protocol 108.

In some implementations, other security data 302 may be determined from one or more client devices 110, the web server 106, or other computing devices in communication therewith. Based at least partly on the security data 302 associated with the request(s) 102 and the port(s) 104, the security module 306 may generate a security determination 312. In some implementations, the security determination 312 for a particular request 102 may indicate a risk associated with processing the request 102. In other implementations, the security determination 312 may indicate a measurement of the security features associated with the processing of the request 102. In some implementations, the security determination 312 may include a quantitative value. In other implementations, the security determination 312 may include a subjective value, such as "low security" or "high security."

The correction module 130 may determine a control action 132 to take with regard to a request 102 based at least partly on the security determination 312. In some implementations, the correction module 130 may determine correspondence between the security determination 312 and correction data 314. The correction data 314 may associate particular control actions 132 with particular security determinations 312. For example, the correction data 314 may indicate that in situations having high security (e.g., encryption, access credentials, request content 304 that is not private or sensitive), a request 102 may be processed using an unsecured protocol 108. Continuing the example, if a request 102 associated with HTTP is provided to a port 104 configured to process requests using HTTPS, the port 104 may instead process the request 102 using HTTP due to the other security features 308 associated with the request 102. As another example, the correction data 314 may indicate that in situations having low security (e.g., a lack of security features 308 or request content 304 that is private or sensitive), the control action 132 may include rejecting the request 102 rather than processing the request 102. Other control actions 132 based at least partially on the security determination 312 may include modifying a service associated with the request 102 or providing the request 102 to a different port 104. In some implementations, the correction data 314 may include a control action 132 generated or provided via user input. For example, a user associated with a client device 110, platform server 128, or web server 106 may provide one or more commands in JavaScript or a similar language to be executed responsive to a particular security determination 312.

Figure 4:
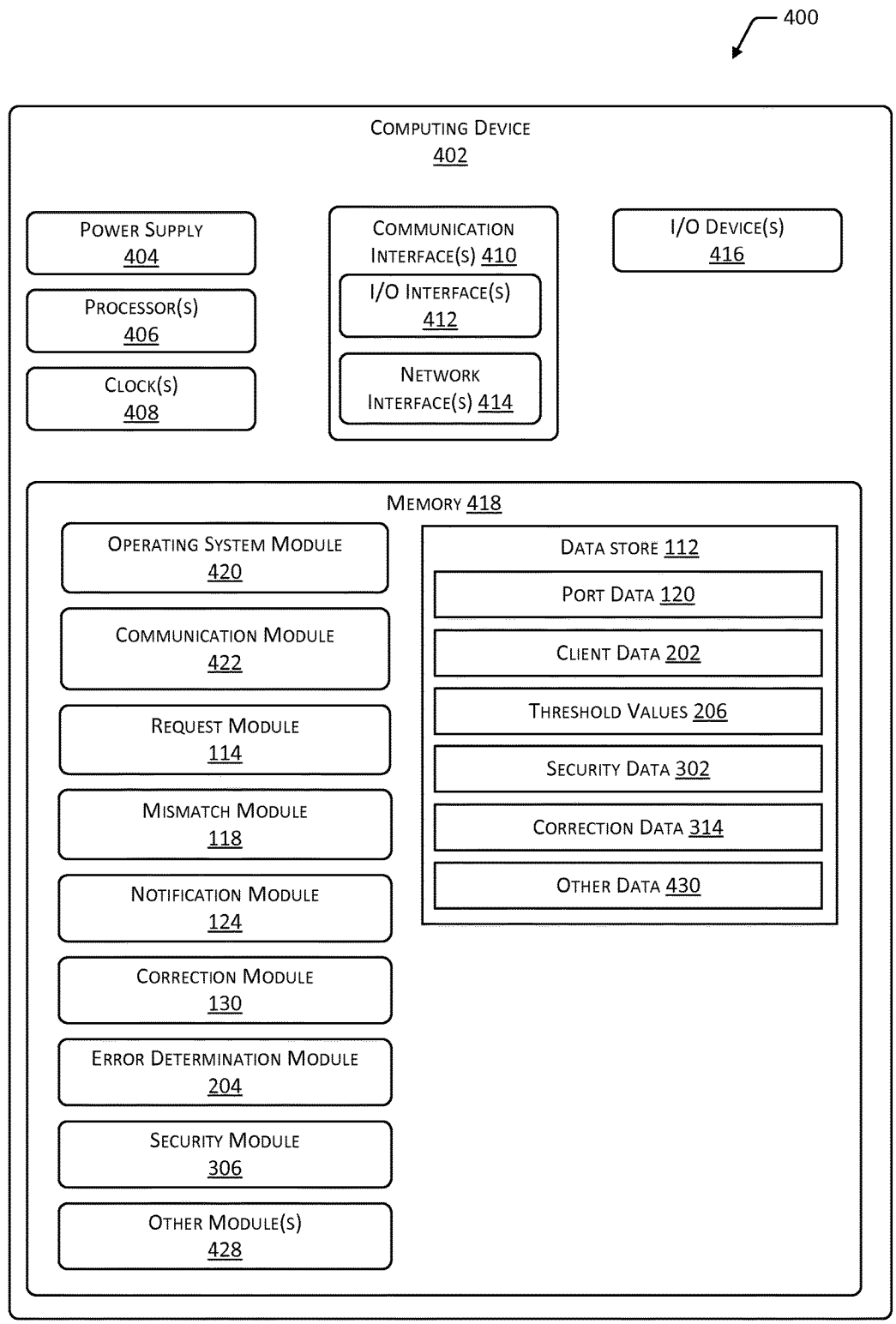
FIG. 4 is a block diagram illustrating a computing device within the scope of the present disclosure.

FIG. 4 is a block diagram 400 illustrating a computing device 402 within the scope of the present disclosure. The computing device 402 may include one or more web servers 106, one or more client devices 110, or one or more other computing devices 402 in communication with one or more of the web server(s) 106 or client device(s) 110. As described previously, one or more of the functions discussed with regard to the modules within the data store 112 may be performed by the web server(s) 106, by one or more client devices 110, or by a separate computing device 402. Any type of computing device 402 and any number of networked computing devices may perform the implementations described herein.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with the computing device 402. For example, I/O devices 416 may include touch sensors, keyboards, mouse devices, microphones, image sensors (e.g., cameras), scanners, displays, speakers, haptic devices, printers, and so forth. In some implementations, the I/O devices 416 may be physically incorporated with the computing device 402 or may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs, wide area networks (WANs), wireless WANs, and so forth. For example, the network interfaces 414 may include devices compatible with Ethernet, Wi-Fi, Bluetooth, ZigBee, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

The data store 112 and one or more of the following modules may also be stored in the memory 418. The modules may be executed as foreground applications, background tasks, daemons, and so forth. The data store 112 may use a flat file, database, linked list, tree, executable code, script, or other data structure to store information. In some implementations, the data store 112 or a portion of the data store 112 may be distributed across one or more other devices including other computing devices 402, network attached storage devices, and so forth.

A communication module 422 may be configured to establish communications with one or more other computing devices 402, such as the web server(s) 106, client devices 110, and other computing devices 402 associated therewith. The communications may be authenticated, encrypted, and so forth.

The memory 418 may store the request module 114. The request module 114 may receive a request 102 from a computing device 402. Requests 102 may be generated and provided by users associated with computing devices 402, one or more services executing on a computing device 402, and so forth. A request 102 may include identifiers associated with the source and destination of the request 102, and an identification of one or more resources stored in the data store 112 for which access is requested. The request 102 may also include an indication of a type of access. For example, a request 102 may indicate read access to determine a current value of a stored resource. As another example, a request 102 may indicate write access to modify, delete, or replace a resource. When processing the request 102 itself, the request module 114 may attempt to perform a handshake process or other types of validation or authentication processes to determine whether the protocol 108 and request content 304 associated with the request 102 may be processed at the port 104 to which the request 102 was provided. If the protocol 108 associated with the request 102 does not match the protocol 108 associated with the port 104 at which the request 102 was received, the request module 114 may generate a failure indication 116 indicative of the failure to process the request 102 at the port 104.

The memory 418 may also store the mismatch module 118. Responsive to a failure to process a request 102 at a first port 104(1), the mismatch module 118 may determine whether the protocol 108 associated with the request 102 corresponds to the protocol 108 associated with one or more second ports 104(2). In some implementations, the mismatch module 118 may determine correspondence between at least a portion of the request 102 and the port data 120. The port data 120 may include an indication of at least a subset of the ports 104 that may be used to access the computing device 402. The port data 120 may also include an indication of one or more protocols 108 associated with the ports 104. In some implementations, one or more of the ports 104 may use multiple protocols 108. In other implementations, each port 104 may use a single protocol 108. Based on the correspondence between the port data 120 and the request 102, the protocol 108 associated with the request 102 may be matched with a protocol 108 associated with a second port 104(2). In some implementations, the mismatch module 118 may attempt to process the request 102 using the protocol 108 of the second port 104(2) to determine that the request 102 is valid and able to be processed. The mismatch module 118 may generate an error indication 122 indicative of the protocol 108 associated with the request 102. In some implementations, the error indication 122 may also include an indication of the correspondence between the port data 120 and the request 102.

The memory 418 may additionally store the notification module 124. The notification module 124 may generate and output an error notification 126 indicative of the error indication 122. For example, if the mismatch module 118 does not determine correspondence between the request 102 and the port data 120, this determination may indicate that the request 102 was provided using a protocol 108 that is not used by any port 104 of the computing device 402. As another example, the request may be provided using a protocol 108 associated with one of the ports 104, but an error in the request 102 may prevent processing of the request 102 using the protocol 108. Responsive to the lack of correspondence between the request 102 and the port data 120, the notification module 124 may generate an error notification 126 indicating that the request 102 is erroneous or that the request 102 may not be processed by the computing device 402. If the mismatch module 118 determines correspondence between the request 102 and the port data 120, the error notification 126 may indicate one or more ports 104 that are associated with the protocol 108 of the request 102.

The memory 418 may further store the correction module 130. The correction module 130 may perform one or more control actions 132 with regard to the request 102 responsive to the error indication 122. Control actions 132 may include rejecting the request 102 or otherwise permitting the request 102 to fail, modifying a service, providing the request 102 to a different port 104, or processing the request 102 using a different protocol 108. As described previously with regard to FIG. 3, in some implementations, the correction module 130 may determine a control action 132 to be used with regard to a request 102 based at least partly on a security determination 312 associated with one or more of the request 102 or the port 104. In some implementations, the control action 132 may be determined based on user input.

In some implementations, the memory 418 may store the error determination module 204. The error determination module 204 may determine client data 202 from one or more client devices 110 or other computing devices 402 in communication with the client devices 110. Client data 202 may be indicative of data or software stored or executed on a client device 110, such as an operating system, a browser, access credentials (e.g., a certificate), and so forth. In other implementations, client data 202 may be indicative of hardware components of a client device 110, a location of a client device 110, an IP address or MAC address of a client device, or other characteristics of client devices 110. The error determination module 204 may analyze the client data 202 to determine common characteristics of client devices 110 associated with failed requests 102. For example, a particular access credential, when used in combination with a particular browser may cause requests 102 to fail. The error determination module 204 may determine, based on client data 202, that a count of failed requests 102 equal to or exceeding a threshold value 206 has occurred for client devices 110 associated with the particular access credential and browser. The error determination module 204 may also generate an error source indication 208 indicative of a possible cause of one or more failed requests 102. In some implementations, the error determination module 204 may cause a control action 132 to be undertaken to attempt to correct the possible error. For example, a service that is generating failed requests 102 may be modified, such as by deactivating the service. As another example, a new version of an access credential that is causing failed requests may be replaced with a previous version.

The memory 418 may also store the security module 306. The security module 306 may determine security data 302 from one or more of client devices 110, requests (e.g., request content 304 and security features 308 of a request 102), ports 104, protocols 108, web servers 106, and other communication devices 402 in communication therewith. Security data 302 may be indicative of a type, category, flag, or other characteristic of data, such as whether a request 102 includes private or sensitive information. Security data 302 may also be indicative of security features 308 of a request 102, one or more protocols 108, one or more ports 104, or one or more computing devices 402. Based on the security data 302, the security module 306 may generate a security determination 312, which may include an indication of one or more of risk or security associated with processing of a request 102. Based at least in part on the security determination 312 and correction data 314, the correction module 130 may select a suitable control action 132 to be taken with regard to a request 102. For example, a request 102 that includes HTTP content may be provided to a port 104 configured to process HTTPS. If the security module 306 determines that the request 102 does not include sensitive or private information, or that the request 102 includes one or more security features 308, the control action 132 may include processing of the request 102 at the port 104 using HTTP. In some implementations, the control action 132 based on the security determination 312 may be determine based at least partly on user input.

Other modules 428 may also be present in the memory 418. For example, encryption modules may be used to encrypt and decrypt communications between computing devices 402. Authentication modules may be used to authenticate communications sent or received by computing devices 402. Reporting modules may be used to generate reports indicative of one or more of error notifications 126, control actions 132, successful or failed requests 102, port data 120, client data 202, or security data 302. Data processing modules may access or modify stored resources responsive to requests 102. Other modules 428 may further include a user interface module, which may receive and process user interactions associated with providing requests 102, taking control actions 132, receiving user-generated control actions 132, and so forth.

Other data 430 within the data store 112 may include stored values and other resources, which may be accessed using a request 102, user input data, such as configurations and settings associated with computing devices 402, and so forth. Other data 430 may also include security data, such as encryption keys and schema, access credentials, and so forth. Other data 430 may further include specific control actions 132 generated or provided by a user for execution upon determination of particular circumstances.

In different implementations, different computing devices 402 may have different capabilities or capacities. For example, web servers 106 may have significantly more processor 406 capability and memory 418 capacity compared to the processor 406 capability and memory 418 capacity of client devices 110.

Figure 5:
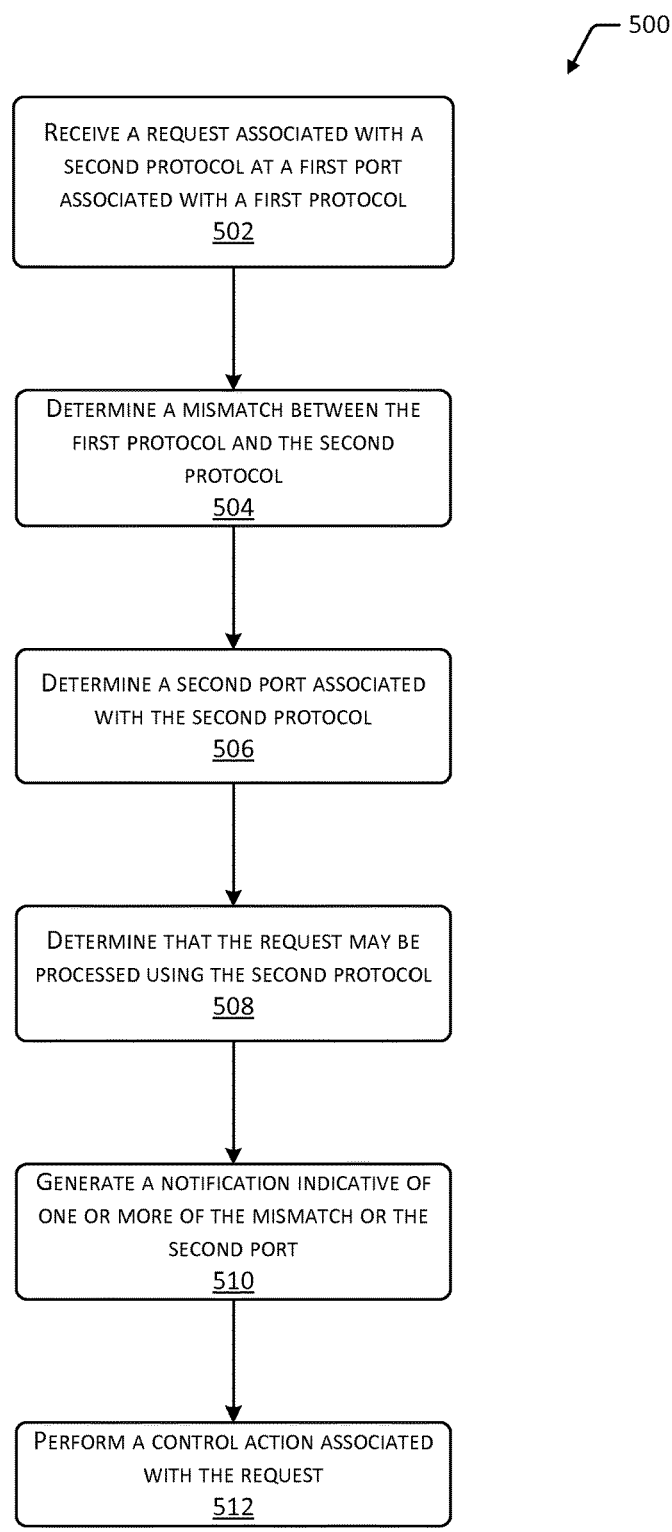
FIG. 5 is a flow diagram illustrating a method for determining a request provided to an incorrect port, generating a notification, and performing a control action.

FIG. 5 is a flow diagram 500 illustrating a method for determining a request 102 provided to an incorrect port 104, generating an error notification 126, and performing a control action 132. Block 502 receives a request 102 associated with a second protocol 108(2) at a first port 104(1) associated with a first protocol 108(1). For example, a client device 110 may generate a request 102 using HTTP and provide the request 102 to a port 104 configured to process requests 102 using HTTPS. In some implementations, one or more of the first port 104(1) or the second port 104(2) may be configured to process requests 102 having a particular characteristic, such as a size less than or equal to twenty bytes. For example, a client device 110 may generate a request 110 having a size greater than twenty bytes but may provide the request 102 to a port 104 configured to process requests having a size less than twenty bytes.

Block 504 determines a mismatch between the first protocol 108 and the second protocol 108. Continuing the example, when the first port 104, configured to use HTTPS, attempts to process a request 102 associated with HTTP, the request 102 may fail the handshake process (e.g., due to the absence of a "ClientHello" or other expected content of the request 102). However, in addition to processing requests 102 using the first protocol 108, the first port 104 may also be configured to monitor incoming requests 102 for use of other protocols 108 associated with other ports 104 of a web server 106 or similar computing device 402.

Block 506 determines a second port 104(2) associated with the second protocol 108(2). Continuing the previous example, a different port 104 of the web server 106 may be configured to process requests 102 using HTTP rather than HTTPS. Determination of this second port 104(2) may indicate that the request 102 may have been inadvertently provided to the incorrect port, such as due to misconfiguration of a service generating the request 102. In some implementations, the first port 104 may additionally be configured to monitor incoming requests 102 that lack a particular characteristic (e.g., a request size) and determine other ports 104 that may be configured to process requests 102 lacking the characteristic.

Block 508 determines that the request 102 may be processed using the second protocol 108(2). For example, upon determination that the request 102 is associated with HTTP, the first port 104(1) may cause at least a portion of the request 102 to be analyzed or processed to determine whether the request content 304 may be successfully processed using HTTP.

Block 510 generates a notification indicative of one or more of the mismatch or the second port 104(2). For example, an error notification 126 may indicate that the protocol 108 associated with the request 102 does not match the protocol 108 associated with the port 104 to which the request 102 was provided. The error notification 126 may also indicate one or more other ports 104 associated with the same protocol 108 as that associated with the request 102. If the port 104 at which the request 102 was received is configured to process requests 102 having a particular characteristic, the error notification 126 may also indicate this characteristic. Responsive to the error notification 126, a client associated with the service or device from which the request 102 originated may modify the protocol 108 or port 104 associated with subsequent requests 102.

Block 512 performs a control action 132 associated with the request 102. As described previously with regard to FIGS. 1-4, control actions 132 may include rejecting a request 102 or permitting the request 102 to fail, modifying a service associated with the request 102, providing the request 102 to a different port 104, or processing the request 102 using a different protocol 108. In some implementations, the control action 132 may be based on user input. For example, a user may provide code that may be executed to cause performance of one or more particular control actions 132.

Figure 6:
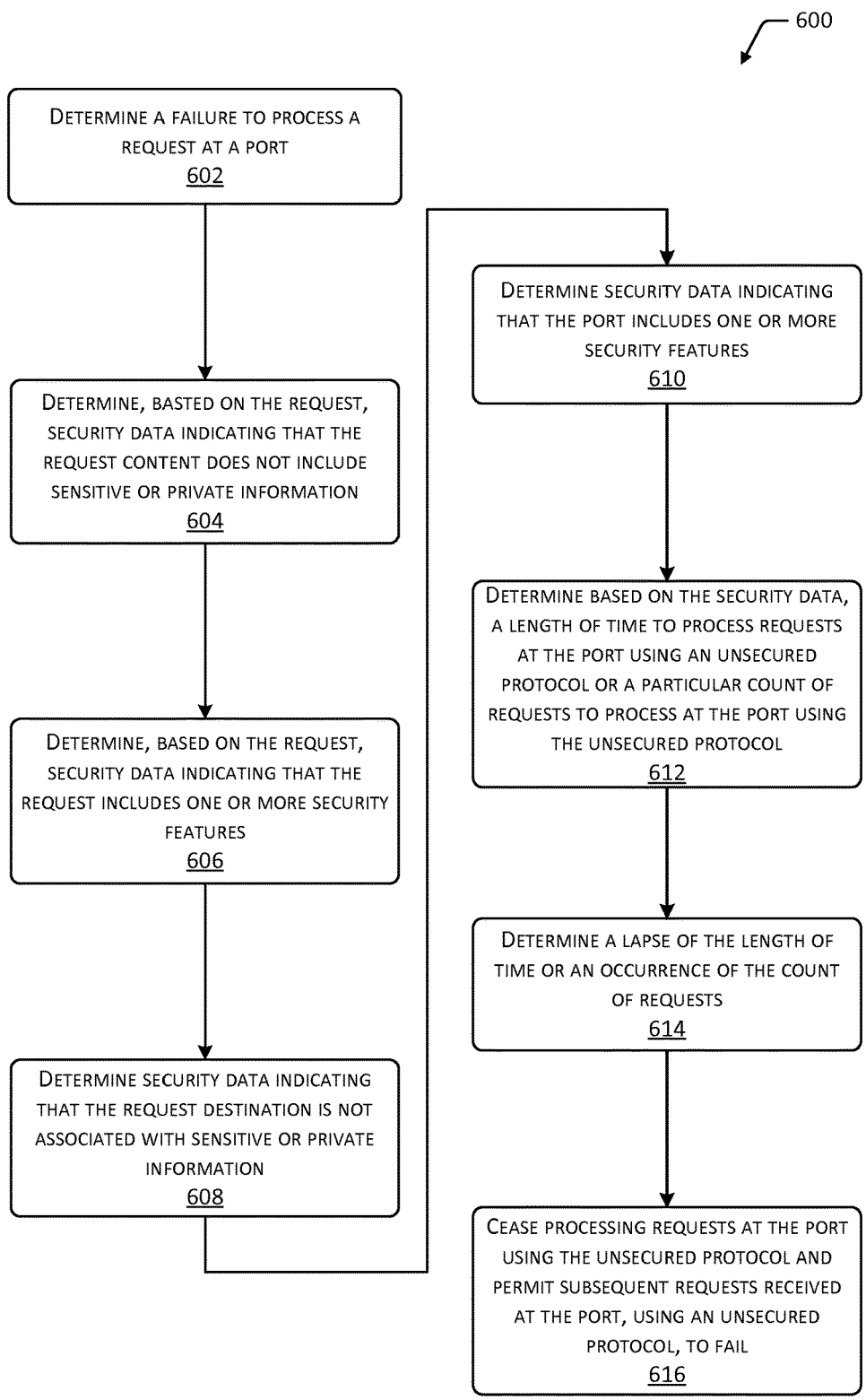
FIG. 6 is a flow diagram illustrating a method for determining a control action to be taken with regard to a failed request based on security data associated with the request or with the port to which the request was provided.

FIG. 6 is a flow diagram 600 illustrating a method for determining a control action 132 to be taken with regard to a failed request 102 based on security data 302 associated with the request 102 or with the port 104 to which the request 102 was provided. Block 602 determines a failure to process a request 102 at a port 104. For example, a request 102 associated with a particular protocol 108 may be received at a port 104 associated with a different protocol 108. In other implementations, other sources of error, such as misconfiguration of a service, an access credential, and so forth, may cause failure of a request 102.

Block 604 determines, based on the request 102, security data 302 indicating that the request content 304 does not include sensitive or private information. For example, metadata associated with the request 102 may be analyzed to determine whether the request 102 is flagged as including confidential information, financial information, and so forth that may be considered sensitive or private. As another example, the request content 304, itself, may be analyzed for particular alphanumeric data, image data, audio data, and so forth that may include sensitive or private information. The security data 302 may be used to determine a control action 132 to be taken with respect to request 102. For example, if it is determined that the request 102 includes sensitive or private information, the request 102 may be rejected or permitted to fail.

Block 606 determines, based on the request 102, security data 302 indicating that the request 102 includes one or more security features 308. For example, the request 102 may include encrypted data, one or more portions that are restricted using access credentials, and so forth. The security data 302 may be used to determine the control action 132 to be taken with regard to the request 102. For example, if is determined that the request 102 is not encrypted or does not include any other security features 308, the request 102 may be rejected or permitted to fail.

Block 608 determines security data 302 indicating that the request destination 310 is not associated with sensitive or private information. For example, the request 102 may include data configured to target one or more locations, devices, resources, data containers, or other addresses or identifiers associated with the destination or target of the request 102. Data associated with the request destination 310 may indicate that the request destination 310 is not associated with private, sensitive, or confidential data or requests 102. The security data 302 may be used to determine a control action 132 to be taken with respect to request 102. For example, if it is determined that the request destination 310 is associated with sensitive or private information, the request 102 may be rejected or permitted to fail.

Block 610 determines security data 302 indicating that the port 104 includes one or more security features. For example, access to the port 104 may be restricted to particular credentials, passwords, IP addresses, user accounts, locations, and so forth. The security data 302 may be used to determine the control action 132 to be taken with regard to request 102. For example, if is determined that the port 104 does not include any manner of restricted access or other security features 308, the request 102 may be rejected or permitted to fail. As another example, the security data 302, determined from the request content 304, may indicate that the request 102 does not relate to private or sensitive information. The security data 302, determined from the port 104 and the security features 308 associated with the request 102 may indicate that one or more of the request 102 or the port 104 includes security features. Based on these determinations, other control actions 132 may be taken. Continuing the example, based on the security data 302, a request 102 associated with HTTP may be processed at a port 104 associated with HTTPS, using HTTP, for a limited amount of time. The length of time for the control action 132 may be determined, based on the security data 302. As another example, based on the security data 320, a particular count of requests 102 associated with HTTP may be processed at the port 104. After the particular count of requests 102 has been processed, the port 104 may cease processing additional requests 102 associated with HTTP.

Block 612 determines, based on the security data 302, a length of time to process requests 102 at the port 104 using an unsecured protocol 108 or a particular count of requests 102 to process at the port 104 using the unsecured protocol 108. In some implementations, a single request 102 may be processed at the port 104, while subsequent requests 102 received at the port 104 using the incorrect protocol 108 may be permitted to fail. For example, a web server 106 may process an erroneous request 102 while generating an error notification 126 indicative of the error in the request 102. If a client associated with the client device 110 from which the request 102 originated does not correct the error, subsequent requests 102 provided to the incorrect port 104 may fail. In other implementations, requests 102 using the incorrect protocol 108 may be processed at the port 104 for a selected length of time, such as thirty minutes. The determined length of time may be greater if the request 102 or request destination 310 is not associated with private or sensitive information or if one or more security features 308 are associated with the request 102, the request destination 310, or with the port 104. The determined length of time may be less if the request 102 or request destination 310 includes private or sensitive information or if no security features 308 are associated with one or more of the request 102, the request destination 310, or the port 104. The length of time may include a quantity of time (e.g., the next sixty minutes) or the occurrence of a particular time (e.g., until 18:37). In other implementations, a particular count of requests 102 using the incorrect protocol 108 may be processed at the port 104, such as twenty requests 102. The determined count of requests 102 may be greater if the request 102 or request destination 310 is not associated with private or sensitive information, or less if the request 102 or request destination 310 is associated with private or sensitive information. The determined count of requests 102 may be greater if the request 102, request destination 310, or port 104 includes security features 308, and less if the request 102, request destination 310, or port 104 lacks security features 308.

Block 614 determines a lapse of the length of time or an occurrence of the count of requests 102. For example, one or more clocks 408 associated with a web server 106 may determine one or more of the start of the length of time (e.g., the time when the erroneous request 102 is received or processed), the end of the length of time, the passage of the length of time, or the occurrence of a particular time.

Block 616 ceases processing requests 102 at the port 104 using the unsecured protocol 108 and permitting subsequent requests 102 received at the port 104, using an unsecured protocol 108, to fail. For example, after the length of time has lapsed, if a client associated with the client device 110 from which the request 102 originated has not corrected the error, subsequent requests 102 provided to the incorrect port 104 may fail. The length of time or the count of requests 102 may be specific to a particular entity or device. For example, a first service may be permitted to provide a first count of requests 102 to an improper port 104. If a second service provides a similar request 102 to the same port 104 using the same incorrect protocol 108, the second service may be permitted to provide a separate count of requests 102, specific to that second service, to the improper port 104.

Figure 7:
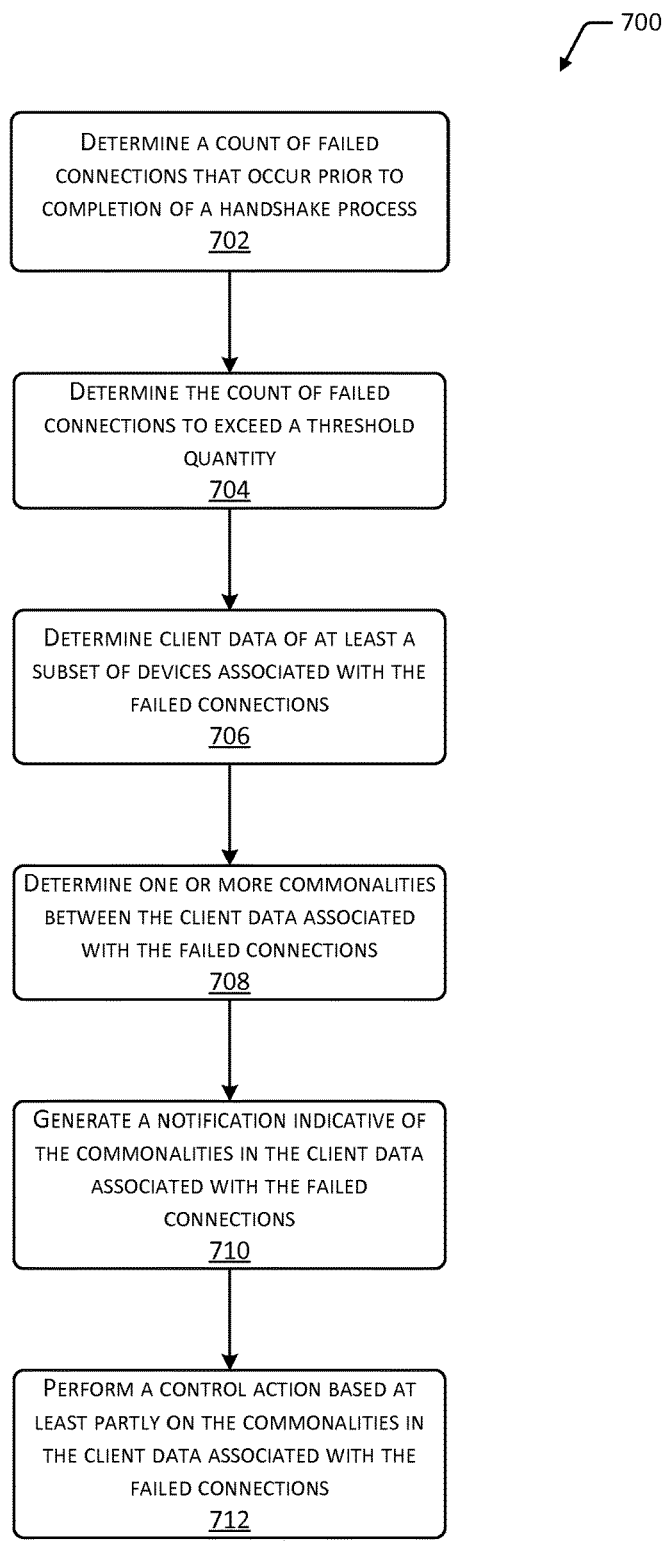
FIG. 7 is a flow diagram illustrating a method for determining commonalities in client data associated with failed connections, generating a notification, and performing a control action.

FIG. 7 is a flow diagram 700 illustrating a method for determining commonalities in client data 202 associated with failed connections, generating a notification, and performing a control action 132. Block 702 determines a count of failed connections that occur prior to completion of a handshake process. One example of a failed connection may include a failed request 102. The request 102 may be provided to a port 104 configured to process a different protocol 108 than that associated with the request 102. As a result, the request 102 may fail the handshake process at the port 104. If a small count of requests 102 fails the handshake process, this may indicate an error in the request(s) 102, an error in a service providing the request(s) 102, and so forth. However, if a large count of requests 102 (e.g., in excess of a threshold value 306) fails the handshake process, this may indicate a widespread or systemic source of error.

Block 704 determines the count of failed connections to exceed a threshold quantity 306. In some implementations, the threshold quantity 306 may include a fixed quantity, such as one hundred failed connections. In other implementations, the threshold quantity 306 may include a percentage quantity, such as ten percent of the total number of requests 102 received at a port 104 or at a web server 106. In still other implementations, the threshold quantity 306 may include a dynamic quantity based on a historic count or percentage of failed connections. For example, exceeding of a threshold quantity 306 may occur when the percentage of failed connections deviates from a historical average percentage by more than the threshold quantity 306.

Block 706 determines client data 202 of at least a subset of devices associated with the failed connections. Client data 202 may include data indicative of the operating system, browser, or other software executing on a client device 110. Client data 202 may also include data indicative of one or more certificates or other access credentials associated with a client device 110, service, or account. Client data 202 may additionally include data indicative of a location of a client device 110 or of one or more characteristics of the client device 110, such as an IP address, MAC address, data associated with a user account, and so forth. Client data 202 may also include data indicative of device components or historical data associated with client devices 110.

Block 708 determines one or more commonalities between the client data 202 associated with the failed connections. For example, a subset of the determined client data 202 may be analyzed to determine whether failed connections are common to client devices 110 in a particular location, client devices 110 associated with a particular browser or operating system, client devices 110 associated with a particular access credential, and so forth. Continuing the example, a particular certificate when used in conjunction with a particular browser may cause a failed handshake process. The particular certificate may function properly when used with other browsers, while the particular browser may function properly when used with other access credentials. Based on the client data 202, it may be determined that a count of failed connections in excess of the threshold quantity 306 is associated with client devices 110 that use both the particular certificate and the particular browser.

Block 710 generates a notification indicative of the commonalities in the client data 202 associated with the failed connections. For example, an error source indication 208 describing a possible source of the failed connections may be generated and provided to the web server 106 or another computing device 402 associated therewith. Based on the error source indication 208, a client associated with the web server 106 or other computing device 402 may correct one or more potential errors. Continuing the example, an access credential or browser causing failed connections may be modified or replaced to prevent the failure of subsequent connections.

Block 712 performs a control action 132 based at least partly on the commonalities in the client data 202 associated with the failed connections. For example, if it is determined that a particular certificate, when used in conjunction with a particular browser, may cause a failed handshake process, the control action 132 may include replacing the certificate with a previous version of the certificate. Other control actions 132 may include modifying data, services, protocols 108, and so forth associated with client devices 110, web servers 106, ports 104, and so forth. For example, a service associated with failed connections may be modified to provide requests 102 using a different protocol 108 or to provide requests 102 to a different port 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a web server including at least a first port and a second port, the first port being configured to receive requests associated with a first protocol and the second port being configured to receive requests associated with a second protocol,
    wherein one or more processes associated with the first port and the second port are configured to identify requests associated with the first protocol and the second protocol;
    one or more memories storing computer-executable instructions; and
    one or more hardware processors configured to execute the computer-executable instructions to:
        receive a request associated with the second protocol at the first port;
        determine a failure of the request based on a mismatch between the first port and the second protocol;
        determine, based at least partly on the failure of the request at the first port, that the second protocol associated with the request does not match the first protocol associated with the first port;
        determine that the request received at the first port is associated with the second protocol;
        generate a notification indicative of the request being associated with one or more of an incorrect protocol or an incorrect port;
        determine security data associated with one or more of the request, the first port, the second port, the first protocol, or the second protocol, wherein the security data is indicative of security risks associated with processing of the request received at the first port;
        determine a control action based at least in part on the security risks associated with processing of the request at the first port, wherein the control action includes causing the request received at the first port to be processed using the second protocol for one or more of a length of time or a count of requests;
        determine the one or more of the length of time or the count of requests based on the security risks;
        determine one or more of a lapse of the length of time or an occurrence of the count of requests; and
        reject a subsequent request associated with the second protocol received at the first port.

2. The system of claim 1, further comprising computer-executable instructions to:
    determine receipt of the request associated with the second protocol to be within the one or more of the length of time or the count of requests; and
    process the request received at the first port using the second protocol.

3. The system of claim 1, further comprising computer-executable instructions to:
    determine, responsive to the failure, client data associated with a client device providing the request, wherein the client data is indicative of one or more of an address associated with the client device or software executing on the client device;
    determine correspondence between the client data associated with the client device and the client data associated with one or more previous requests;
    determine an error associated with the one or more previous requests; and
    generate an error notification indicative of the error.

4. A system comprising:
    one or more memories storing computer-executable instructions; and
    one or more hardware processors configured to execute the computer-executable instructions to:

determine a failure to process a request received at a first port associated with a first protocol, wherein the request is associated with a second protocol;

responsive to the failure, determine correspondence between at least a portion of the request and port data indicative of one or more protocols associated with one or more second ports;

determine at least a subset of the one or more second ports configured to receive requests associated with the second protocol;

generate a notification indicative of one or more of: the failure to process the request received at the first port, or the at least a subset of the one or more second ports being configured to receive the requests associated with the second protocol;

determine security data associated with one or more of the request, the first port, the second port, the first protocol, or the second protocol, wherein the security data is indicative of security risks associated with processing of the request received at the first port;

determine a control action based at least in part on the security risks, wherein the control action includes causing the one or more hardware processors to process the request received at the first port;

based on the security risks, determine one or more of a length of time for processing requests received at the first port using the second protocol or a count of requests received at the first port for processing using the second protocol;

determine receipt of the request associated with the second protocol to be within the one or more of the length of time or the count of requests; and process the request received at the first port using the second protocol.

5. The system of claim 4, wherein the computer-executable instructions to determine the failure include computer-executable instructions to:

determine a mismatch between a handshake portion of the request and protocol data indicative of an expected handshake associated with the first protocol.

6. The system of claim 4, further comprising computer-executable instructions to:

determine, responsive to the failure, first client data associated with a first client device providing the request, wherein the first client data is indicative of one or more of: a characteristic the first client device or software executing on the first client device;

access second client data associated with one or more second failures to process requests at the first port;

determine correspondence between the first client data and the second client data; and based at least partly on the correspondence between the first client data and the second client data, generate an error notification indicative of the one or more of the characteristic of the first client device or the software executing on the first client device.

7. The system of claim 4, further comprising computer-executable instructions to:

determine, responsive to the failure, first client data associated with a first client device providing the request, wherein the first client data is indicative of one or more of: a characteristic the first client device or software executing on the first client device;

access second client data associated with one or more second failures to process requests at the first port;

determine correspondence between the first client data and the second client data;

based at least partly on the correspondence between the first client data and the second client data, determine an error associated with one or more of a client software or an access credential; and based at least partly on the error, modify the one or more of the client software, the access credential, or software associated with one or more of the first port or the second port.

8. The system of claim 4, further comprising computer-executable instructions to:

determine that the security data indicates a low security risk associated with causing the one or more hardware processors to process the request received at the first port; and determine the control action that corresponds to the low security risk.

9. The system of claim 8, further comprising computer-executable instructions to:

determine receipt, at the first port, of at least one second request associated with the second protocol subsequent to one or more of a lapse of the length of time or an occurrence of the count of requests; and reject the at least one second request.

10. The system of claim 4, further comprising computer-executable instructions to:

determine, responsive to the failure, first client data associated with a first client device providing the request, wherein the first client data is indicative of one or more of: a characteristic the first client device or software executing on the first client device;

determine receipt of one or more second requests associated with the first protocol at the first port;

determine correspondence between second client data associated with the one or more second requests and the first client data;

provide, to one or more devices associated with the one or more second requests, the notification indicative of one or more of: the failure to process the request received at the first port, or the at least a subset of the one or more second ports being configured to receive requests associated with the second protocol;

determine the control action associated with the request; and perform the control action with regard to the one or more second requests.

11. The system of claim 4, wherein the computer-executable instructions to determine correspondence between the at least a portion of the request and the port data include computer-executable instructions to:

process the at least a portion of the request using the second protocol to determine that the request complies with the second protocol;

determine a response associated with processing of the at least a portion of the request using the second protocol;

determine, based at least partly on the response, security data associated with processing of the at least a portion of the request using the second protocol; and wherein the control action is performed responsive to determining that the request complies with the second protocol.

12. A method comprising:

determining a failure to process a request associated with a first protocol, wherein the request is received at a first port configured to receive requests associated with a second protocol;

responsive to the failure, determining correspondence between at least a portion of the request and data indicative of one or more protocols associated with at least a second port;

determining, based at least in part on the correspondence, that the second port is configured to receive requests associated with the first protocol;

generating a notification indicative of one or more of: the failure to process the request received at the first port, or the second port being configured to receive the requests associated with the first protocol;

determining security data associated with one or more of the request, a source of the request, a destination associated with the request, a location associated with the request, the first port, the second port, the first protocol, or the second protocol, wherein the security data is indicative of one or more security risks associated with causing one or more hardware processors to process the request received at the first port;

determining, based at least in part on the one or more security risks, one or more of a length of time for processing requests received at the first port or a count of requests to be processed at the first port;

determining receipt of the request associated with the second protocol prior to one or more of a lapse of the length of time or an occurrence of the count of requests; and processing the request.

13. The method of claim 12, further comprising:
determining that the security data indicates a low security risk;
determining a control action that corresponds to the low security risk, wherein the control action includes processing requests that are received within the one or more of the length of time or the count of requests at the first port.

14. The method of claim 12, further comprising:
providing the notification with the one or more of the length of time or the count of requests.

15. The method of claim 12, further comprising:
determining that the security data indicates a high security risk associated with causing the one or more processors to process the request received at the first port;
determining a control action that corresponds to the high security risk, wherein the control action includes rejecting requests received subsequent to the one or more of the length of time or the count of requests.

16. The method of claim 12, further comprising:
determining a service associated with the request; and
based at least in part on the security data, modifying the service.

17. The method of claim 12, further comprising:
determining, responsive to the failure, first client data associated with a first client device providing the request, wherein the first client data is indicative of one or more of: a characteristic of the first client device or software executing on the first client device;
determining second client data associated with one or more second failures to process requests at the first device;
determining, based on one or more of the first client data and the second client data, one or more of: common characteristics of client devices or common software executing on client devices; and
generating an error notification indicative of the one or more of the common characteristics of client devices or the common software executing on client devices.

18. The method of claim 12, further comprising:
determining, responsive to the failure, first client data associated with a device providing the request, wherein the first client data is indicative of one or more of: a characteristic of the device or software executing on the device;
determining correspondence between the first client data and second client data associated with one or more previous requests;
determining a control action associated with the one or more previous requests; and
performing the control action responsive to the failure to process the request.

19. The system of claim 4, wherein the security data includes one or more of:
content of the request;
a security feature of the request;
a security feature of the first port;
a security feature of the first protocol;
a location associated with the request;
a source associated with the request; or
a destination associated with the request.

20. The system of claim 12, wherein the security data includes one or more of:
content of the request;
a security feature of the request;
a security feature of the first port;
a security feature of the first protocol;
a security feature of the second protocol;
a security feature of the location associated with the request;
a security feature of the source associated with the request; or
a security feature of the destination associated with the request.

* * * * *